United States Patent
Zumkehr et al.

(10) Patent No.: US 6,247,118 B1
(45) Date of Patent: Jun. 12, 2001

(54) SYSTEMS AND METHODS FOR TRANSIENT ERROR RECOVERY IN REDUCED INSTRUCTION SET COMPUTER PROCESSORS VIA INSTRUCTION RETRY

(75) Inventors: John F. Zumkehr, Orange, CA (US); Amir A. Abouelnaga, Great Falls, VA (US)

(73) Assignees: McDonnell Douglas Corporation, St. Louis, MO (US); TRW, Inc., Redondo Beach, CA (US)

(*) Notice: Subject to any disclaimer, the term of this patent is extended or adjusted under 35 U.S.C. 154(b) by 0 days.

(21) Appl. No.: 09/092,237

(22) Filed: Jun. 5, 1998

(51) Int. Cl.[7] .............................. G06F 9/30; G06F 11/00
(52) U.S. Cl. ..................... 712/228; 712/244; 714/17; 714/21
(58) Field of Search ..................... 712/244, 228; 714/10, 11, 12, 15, 16, 17, 21

(56) References Cited

U.S. PATENT DOCUMENTS

| | | | |
|---|---|---|---|
| 3,533,065 | * 10/1970 | McGilvray et al. | 714/16 |
| 3,533,082 | * 10/1970 | Schnabel et al. | 714/16 |
| 3,618,042 | * 11/1971 | Miki et al. | 714/17 |
| 4,703,481 | * 10/1987 | Fremont | 714/17 |
| 4,912,707 | * 3/1990 | Kogge et al. | 714/17 |
| 5,263,032 | 11/1993 | Porter et al. | |
| 5,269,017 | * 12/1993 | Hayden et al. | 714/15 |
| 5,418,916 | 5/1995 | Hall et al. | |
| 5,495,587 | 2/1996 | Comfort et al. | |
| 5,495,590 | 2/1996 | Comfort et al. | |

OTHER PUBLICATIONS

Tamir, Yuval et al., *The Implementation and Application of Micro Rollback in Fault–Tolerant VLSI Systems*, IEEE 1988, pp. 234–239.*

Lee, Yann–Hang et al., *Optimal Design and Use of Retry in Fault–Tolerant Computer Systems*, Journal of the Association for Computing Machinery, vol. 35, No. 1, Jan. 1988, pp. 45–69.*

* cited by examiner

Primary Examiner—Richard L. Ellis
(74) Attorney, Agent, or Firm—Alston & Bird LLP

(57) ABSTRACT

Systems and methods for transient error recovery in pipelined reduced instruction set computer (RISC) processors prevent state changes based on the execution of an instruction until the execution of the instruction is validated. If a transient fault occurs causing an error to appear in an instruction execution, the instruction is retrieved using an instruction fetch address associated with that instruction and is stored in a pipeline history cache. The RISC processor pipeline is then restarted with that instruction. The validation of the execution of an instruction may take place in the execution stage, though processors with high clock frequencies may include a separate validate stage in the pipeline so that there is adequate time to validate the execution of the instruction without having to decrease the clock frequency.

12 Claims, 4 Drawing Sheets

FIG. 1.

| INSTRUCTION FETCH | REGISTER FETCH | EXECUTION STAGE | WRITE-BACK TO REGISTER | |
|---|---|---|---|---|
| IF | RF | ALU | WB | |
| | IF | RF | ALU | WB |
| | | IF | RF | ALU | WB |

(Instruction 1, Instruction 2, Instruction 3)

FIG. 4.

| INSTRUCTION FETCH | REGISTER FETCH | EXECUTION STAGE | COMPARE RESULTS | WRITE-BACK TO REGISTER | |
|---|---|---|---|---|---|
| IF | RF | ALU | VAL | WB | |
| | IF | RF | ALU | VAL | WB |
| | | IF | RF | ALU | VAL | WB |

(Instruction 1, Instruction 2, Instruction 3)

SYSTEMS AND METHODS FOR TRANSIENT ERROR RECOVERY IN REDUCED INSTRUCTION SET COMPUTER PROCESSORS VIA INSTRUCTION RETRY

The U.S. Government has a paid-up license in this invention and the right in limited circumstances to require the patent owner to license others on reasonable terms as provided for by the terms of Contract No. FO3602-88-C-0058, Subcontract AB97202185, awarded by the Air Force.

FIELD OF THE INVENTION

The present invention generally relates to data processing, and more particularly, to fault recovery in a data processing system.

BACKGROUND OF THE INVENTION

A popular design for central processing units is reduced instruction set computer (RISC) processors using a pipeline architecture. With pipeline architecture, the tasks performed by a processor are broken down into a sequence of functional units referred to as stages or pipeline stages. Each functional unit receives one or more inputs from the previous stage and produces one or more outputs which may then be used by the subsequent stage. Thus, one stage's output is usually the next stage's input. Consequently, all of the stages are able to work in parallel on different, although typically sequential, instructions in order to provide greater throughput.

Typical stages of a RISC processor pipeline include instruction fetch, register fetch, arithmetic execution, and write-back to registers. In order to improve performance, the pipeline receives a continuous stream of instructions fetched from sequential locations in memory using addresses that are typically stored in a program counter or other suitable device. When several instructions are being concurrently processed in the pipeline and each pipeline stage is performing its designated task, a single instruction can be executed approximately every clock cycle. This design offers greater efficiency than other architectures, such as complex instruction set computer (CISC) architectures, which require more than one clock cycle to execute an instruction.

Because of its many advantages, only a few of which are discussed above, the RISC architecture enjoys a wide variety of applications including those with safety critical implications such as health care, transportation, military, space, and some manufacturing environments.

The increased reliance on RISC processor-based automated data processing systems in safety critical applications raises the need for the system to be dependable; that they perform their expected task(s) correctly with a high degree of confidence. Design for dependability is one of the many drivers that define the specifications of the RISC processor-based system. Fault avoidance, removal, and tolerance are three approaches that improve system dependability. Fault avoidance is usually achieved by processes and methods used to generate the design of the system such as adherence to proven design and development processes or the use of formal methods to validate the correctness of a design. Fault removal is usually achieved by extensive system testing. A fault is removed once it is discovered during system test. Fault tolerance is achieved by incorporating features in the design that enable continued correct system operation in spite of the occurrence of a fault.

A fault may be permanent or transient. A permanent fault is one that causes the RISC processor's behavior to permanently deviate from its specifications, and typically requires human intervention to ameliorate its effect. A transient fault, on the other hand, causes the behavior deviation for a limited time period. The processor typically resumes its behavior as specified once the cause of the fault disappears and the effect of the fault is removed from the system.

Transient faults are typically caused by an event in the processor's physical environment. For example, in an industrial application, many transient faults are due to the electrically noisy environment where equipment switching causes voltage spikes that impact the processor's power supply, and thus causing a transient fault in the microelectronics circuitry that make up the processor. A single event upset (SEU) is yet another cause of transient faults in the microelectronics circuitry of a RISC processor. SEUs are usually caused by a natural or man-made radiation particle that changes the state of a processor by altering its memory content, such as a bit in one of its data or control registers, while it travels through space. Once the radiation particle passes through the circuitry, it no longer affects the microelectronics device. In either of these cases, as well as others, the transient fault may cause the processor to exhibit an error in its processing. In safety critical applications, declaring a processor as permanently failed due to a transient fault may not be a suitable course of action for reasons such as the lack of spare processors to continue operation. This is particularly true in space applications where processors are expected to operate for an extended time period to justify the cost of the mission. Thus, given the existence of transient faults in certain computing environments, it is desirable to be able to detect and recover from transient faults as quickly and as efficiently as possible so that the performance of the processor is not significantly hampered or degraded.

The impact on the performance of a processor from a transient fault depends upon the overhead associated with recovery. Two factors which largely control the overhead of transient fault recovery are: (1) the time spent to continually gather the data necessary in anticipation of recovering from a transient fault, and (2) the actual recovery time, i.e., the time it takes the processor to remove the effect of the fault from its memory and to be ready to resume correct operation. Following are discussions of several techniques used for transient fault recovery.

A relatively common technique for transient fault recovery is checkpoint retry in which the current state data of a program is saved in a memory cache at various points in the execution of the program code. These points are referred to as checkpoints. Checkpoints are taken at the software level where the program is modified to permit the capture of checkpoints and the rollback to a suitable checkpoint during recovery. Typically, only the values of program variables that changed since the last checkpoint are stored at a next checkpoint. When an error is detected, the program state is restored (also referred to as rolled back) to the last checkpoint that preceded the error in the instruction stream. The amount of roll back necessary to reach the nearest checkpoint is called the rollback distance. The rollback distance may be measured by the number of instructions the effect of which must be nullified to reach the nearest checkpoint. Execution is resumed from the checkpoint once the program state is restored from the data stored at the checkpoint. A drawback to this technique is the complexity of the code necessary to allow the data to be gathered at each checkpoint. Another drawback is the relatively high overhead on system performance. The performance overhead of checkpoint retry is largely due to the overhead required for storing the data associated with all the instructions between consecutive checkpoints. This same data is also restored during an actual recovery which, likewise, is time consuming. Further, if more frequent checkpoints are used in order to reduce the amount of data which must be stored at every checkpoint and then restored in case of an error, then more of the processor's time is spent performing error checking. In computing applications requiring control based on precise time intervals, the recovery time spent error checking and rolling back to a checkpoint can be difficult to determine apriori. Finally, in environments where the processor's next task depends upon changes in its physical environment, such as the firing of a jet to correct a spacecraft's attitude or the reaction to a change in the state of a stage in a manufacturing assembly line, recovery times must be bounded to prevent the processor from reacting to a set of environmental conditions that does not truly reflect the processor's physical environment. The analysis and determination of proper recovery time bounds is very difficult.

Another recovery technique referred to as instruction retry is a variation on the checkpoint retry scheme in that the rollback distance is reduced to one instruction. In essence, a checkpoint is obtained prior to the execution of an instruction. The output of the processor is checked for correctness after the execution of the instruction. A detected error causes a checkpoint retry. The processor's state is restored to that which it was prior to the execution of the instruction, and the instruction is fetched again from the instruction memory for a re-execution. This approach minimizes the amount of data saved at every checkpoint by saving the values of variables that would be changed through the execution of the next instruction. The error detection mechanism is typically a comparator that compares the processor's outputs to those of a redundant processor in a master/checker (or duplicate) configuration. The processor's internal memory and register devices that would be affected by the upcoming instruction execution must also be saved by the checkpoint in order to restore the processor's execution environment correctly after rollback. While the recovery time for this technique is very short, its performance overhead is high. The program state data must be saved prior to the execution of an instruction. The output of every instruction is validated. The program's state is restored once recovery is initiated in reaction to a detected error. Establishing a checkpoint and validating every instruction reduces the processor's throughput.

Another recovery technique is to use a hardware-based checkpoint retry mechanism, also referred to as a micro-rollback mechanism. This technique is similar to the checkpoint retry techniques discussed above except that additional hardware is added for automating the storage of state information and data within the processor. Consequently, a disadvantage to a hardware checkpoint retry mechanism is that it utilizes valuable on-chip space for the additional hardware required, essentially denying its use to enhance the processor's functionality and deliver maximum performance. Further, if the error latency is high, more hardware is required to implement the micro-rollback mechanism because more processor data and state information is used and modified after the execution of the instruction in which an error occurs, but before the error is detected. Hardware based checkpoint retry mechanisms are further described in numerous publicly available writings such as, for example, in Y. Tamir et al., "The Implementation and Application of Micro Rollback and Fault-Tolerant VLSI Systems," 18th Fault-Tolerant Computing Symposium, Tokyo, Japan, pp. 234–239, June 1988, where micro rollback is applied to a RISC processor.

The checkpoint retry technique and all its variants implement a recovery strategy that commits the results of one or more computational steps or instructions then react by rolling back the effect of these once an error is detected.

Forward error recovery is another recovery technique that does not rely on restoring the state of a program to one of its previous states, as captured by a checkpoint. Forward error recovery techniques reset the program state to a predetermined initial state based on the kind and location of an error in the code. This technique reduces the performance overhead due to the absence of checkpoint and restoration activities. However, it does introduce uncertainty in the robustness of recovery. The risk is that resetting the program state may not be appropriate for recovering from the particular error. It is very difficult to determine the proper reset data in reaction to every possible error, unless the system is trivially simple. Recovery is typically managed at the program level.

Therefore, a heretofore unresolved need existed in the industry for a recovery system and method that provides improved recovery from transient faults, such as in a pipelined RISC processor, with minimal performance and hardware overhead.

SUMMARY OF THE INVENTION

It is therefore an object of the present invention to provide improved transient fault recovery.

It is another object of the present invention to provide improved transient fault recovery by committing the results of a computation after it is verified to be correct.

It is yet another object of the present invention to reduce the recovery time from transient faults in a reduced instruction set computer (RISC) processor.

It is yet another object of the present invention to provide transient fault recovery systems and methods that can be easily integrated in a RISC processor with minimum hardware and performance penalty.

These and other objects of the present invention are provided by a transient fault recovery system. Processor state changes based on the execution of an instruction are not committed until the instruction is validated. The processor state data related to an instruction, i.e., the instruction state data, are saved as it moves through the pipeline stages. The instruction state data must contain all data necessary to enable the re-execution of the instruction beginning with the first pipeline stage, i.e., the instruction fetch stage in the RISC processor. If an error is detected in the execution of an instruction, then a copy of that instruction is retrieved using the address used to fetch the instruction previously, i.e., the instruction fetch address. The pipeline's upstream stages, i.e., the pipeline stages that are processing instructions that have been fetched subsequent to the instruction that is found to be in error, are purged. The processor is then restarted after its state is reset to a state where the execution can resume without the effect of the transient fault.

The verification of the correct execution, i.e., the validation, of an instruction is performed by one or more error detection mechanisms at every pipeline stage by using appropriate error detection techniques. For example, a simple parity check may be sufficient to validate the correct processing of the instruction by the instruction fetch stage. Parity check may also be sufficient to validate the instruction at the output of the register fetch stage. The output of the execution stage may also be validated by using a master/checker (or duplicate) configuration of the arithmetic transform operators, e.g., the arithmetic logic unit (ALU), and comparing the results. Alternatively, a checker with reduced functionality may be used to minimize the amount of hardware needed and provide an acceptable level of error detection. The amount of acceptable error detection logic at each pipeline stage depends on many factors, including the desired level of fault coverage and the amount of physical space available on the microcircuit to incorporate the logic. Detecting an error during validation will terminate the current execution of the instruction and will not commit any of its results.

The validation at each pipeline stage may take place within that stage, if it can be accomplished within the remaining part of the clock period used by the stage. For example, if the processor's clock period is N units of time and part of this period, say M units of time where M less than N, is consumed by the stage to generate its output(s), then the remaining units of time, (i.e., N–M), can be used to validate these outputs. However, if the number of remaining units of time, (i.e., N–M), is not sufficient for the validation, then enhancing the RISC pipeline with additional pipeline stages dedicated to validating the output of every stage may be necessary. In the worst case, these validation stages may be introduced between the instruction fetch and register fetch stages, between the register fetch and the execution stages, and/or between the execution and write-back stages.

In an embodiment of this invention, only the execution stage may need to be followed by a dedicated validation stage. This is due to the complex logic used by the arithmetic transform operators within the execution stage. A substantial part of the processor's clock period is consumed by this logic to generate results. This is unlike the instruction and register fetch stages where sufficient time would typically be left for the validation within the processor's clock period. Naturally, selecting a clock period that is optimal between the number of pipeline stages and the ability to validate a stage's output within the processor's clock period is critical to determining the processor's effective throughput. A sufficiently long processor clock period allocated to that stage eliminates the need for an additional validation stage, but may reduce the processor's throughput. A sufficiently short processor clock period would, in the worst case, require the addition of a validation stage after the instruction fetch, register fetch, and/or execution stages. The pipeline grows longer where the number of its stages increases. For example, a four-stage pipeline may grow to as many as seven stages. Therefore the processor's effective bandwidth may be reduced. This is because of the effect of the execution of branch instructions on the pipeline's stages as can be recognized by those skilled in the art.

In particular, a data processing system for re-executing an instruction if an error is detected in the prior execution of that instruction comprises the program counter value used to fetch the instruction, i.e., the instruction fetch address. It also includes a memory device referred to herein as the pipeline history cache, which contains the instruction fetch address. The data processing system may also include circuitry to detect errors such as parity code checkers or arithmetic transform operators (e.g., the Arithmetic Logic Unit (ALU)). Alternatively, the arithmetic transform operator circuitry of the data processing system may contain logic for at least partially executing the instruction.

In an embodiment of this invention, the error detection technique used in the execution stage relies on using master/checker configurations of the arithmetic transform operators where a comparator is necessary to validate the instruction prior to committing its results through the write-back stage. The comparator may compare the results of the executed instruction with reference results from the checker. The master/checker pair may be included in the chip's circuitry but would be located far apart to prevent common mode failures. It is noted that the checker may be another processor, provided the processor's clock period is sufficiently long to permit the data from the master and checker to travel to the comparator and for the comparator to produce the result. Error recovery logic is also necessary to reset the program counter to the instruction's fetch address stored in the pipeline history cache. As such, the instruction under execution, at the time an error is detected, can again be fetched and processed through the pipeline's stages.

In accordance with an aspect of the present invention, the transient fault recovery system may abort further execution of the instruction if an error is detected when validating the execution of the instruction. Further, the transient fault recovery system may abort the execution of all instructions in the pipeline subsequent to the instruction where an error is detected.

In yet another aspect of the present invention, a method of error recovery in a data processing system having a memory device, such as a pipeline history cache typically formed by a first-in, first-out (FIFO) cache, comprises of the steps of fetching an instruction using an instruction fetch address, storing the instruction fetch address in the memory device, at least partially executing the instruction, and validating the execution of the instruction prior to implementing a state change based upon the execution of the instruction. Moreover, if an error is detected in the execution of the instruction, then the method may also comprise the step of fetching of the instruction utilizing the instruction fetch address stored in the memory device and re-executing the fetched instruction. The step of validating the execution of the instruction may comprise the step of comparing the results from the execution of the instruction with reference results from, for instance, a redundant microcircuit.

In addition, the method of the present invention may also advantageously include the step of aborting the execution of the instruction if an error is detected in the step of validating the execution of the instruction. Similarly, the method may include the step of aborting the execution of instructions subsequent to the current instruction in the pipeline if an error is detected in the step of validating the execution of the current instruction.

Other features and advantages of the present invention will become apparent to one skilled in the art upon examination of the following drawings and detailed description. It is intended that all such features and advantages be included herein within the scope of the present invention, as defined by the appended claims.

BRIEF DESCRIPTION OF THE DRAWINGS

The present invention can be better understood with references to the following drawings. The elements of the drawings are not necessarily to scale, emphasis instead being placed upon clearly illustrating the principles of the present invention. Furthermore, like reference numerals designate corresponding parts throughout the several views.

FIG. 1 is a schematic illustration of a processor pipeline concurrently executing three instructions;

FIG. 4 is a schematic illustration of the processor pipeline concurrently executing three instructions and including a validate stage after the execution stage to validate the instruction, in accordance with one aspect of the present invention.

DETAILED DESCRIPTION OF PREFERRED EMBODIMENTS

Figure 2:
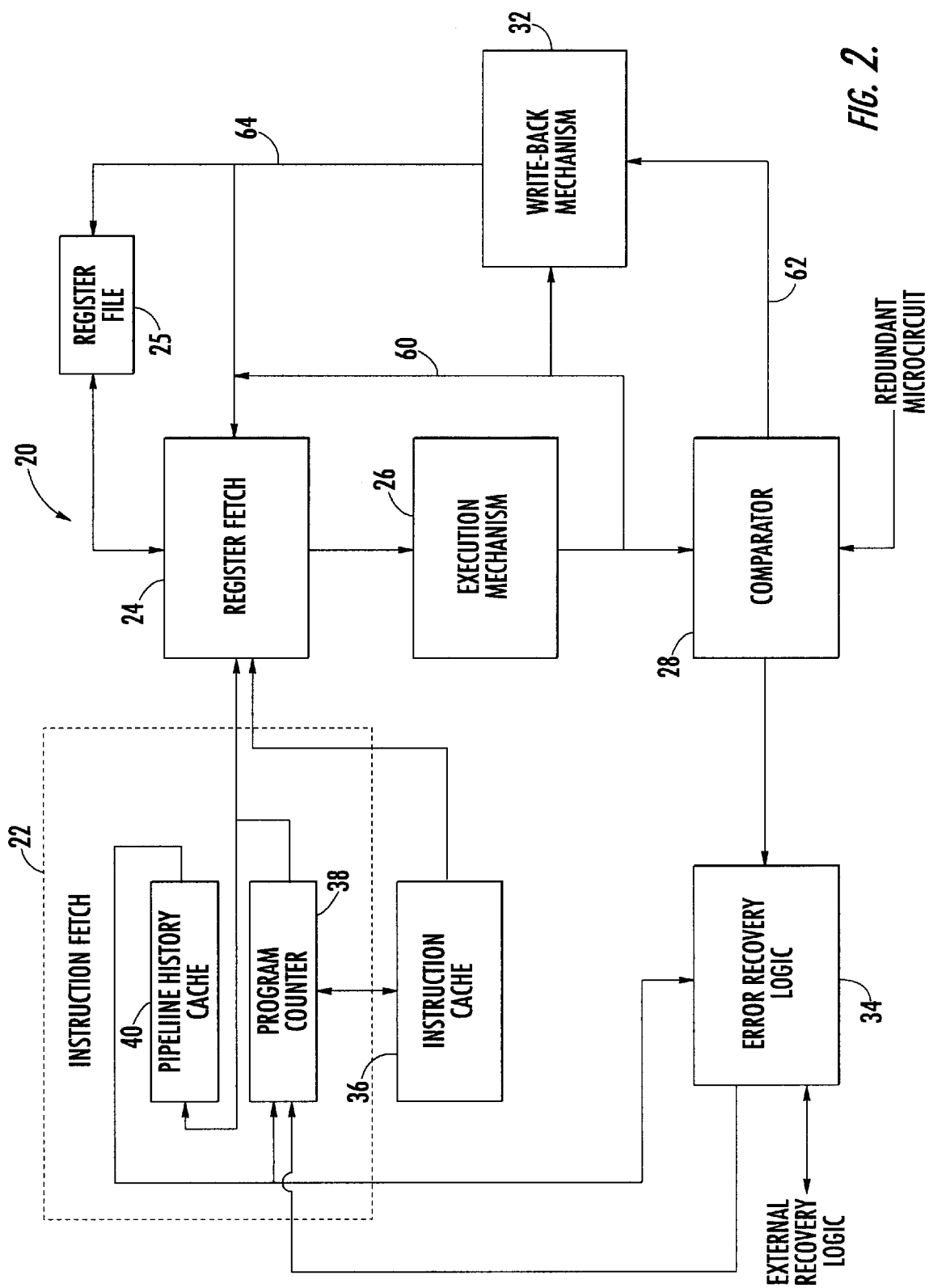
FIG. 2 is a schematic block diagram of a processor including a transient fault recovery system in accordance with an embodiment of the present invention.

The present invention will now be described more fully hereinafter with reference to the accompanying drawings, in which preferred embodiments of the invention are shown. This invention may, however, be embodied in different forms and should not be construed as limited by the embodiment set forth herein. Rather, these embodiments are provided so that this disclosure will be thorough and complete, and will fully convey the scope of the invention to those skilled in the art.

I. Architecture

Referring to FIG. 1, a schematic illustration of a reduced instruction set computer (RISC) pipeline is provided. In the architecture shown, there are four stages: an instruction fetch, a register fetch, an execution stage, and a write-back to register stage. These four stages are merely illustrative of the various stages that can be included as a part of a RISC pipeline architecture, as is appreciated by one skilled in the art.

In the instruction fetch stage, the next sequential instruction to be executed is retrieved, typically from an external or on-chip instruction cache associated with the processor. In the register fetch stage, the retrieved instruction is decoded and the appropriate operands are retrieved from a register file that is typically contained within the processor. In the execution stage, the operands are executed upon by an arithmetic logic unit (ALU), a multiply/divide unit (MU), or a shifter. Upon completion of the execution stage, the write-back to register stage takes the results of the execution stage and writes them back to the register file utilized in the register fetch stage so as to cause a permanent state change. A permanent state change is defined herein as a general register, flag, or memory location that is modified as a result of the execution of an instruction.

In FIG. 1, instructions one, two, and three are being concurrently executed so as to take advantage of the pipeline architecture. Preferably, instructions one, two, and three are taken from sequential memory locations, typically in the instruction cache, and are a part of a larger substantially continuous stream of instructions that are being executed. The instructions are typically retrieved using instruction fetch addresses stored in program counter. Within the instruction cache, the instructions are usually stored in sequential order so that the next instruction to be retrieved is available.

Each stage of the pipeline is preferably implemented with independent hardware so that the instructions can be executed in a concurrent fashion. Thus, the instructions can go from stage to stage in sequential order with several instructions being executed concurrently. As a result, the effective execution time per instruction is approximately one clock cycle, regardless of pipeline length.

Once an instruction is executed, the results are available to subsequent instructions by reading the appropriate register file after the write-back stage or by bypassing the write-back stage and directly using the results of the execution stage in a subsequent instruction. Thus, if an error occurs in the execution of an instruction, the subsequent instructions in the pipeline may be corrupted by using the erroneous results of a previous instruction.

Moreover, the presence of an error in the execution of one or more instructions may interrupt the normal operation of the processor. For the purposes of the present disclosure, an error may be caused by a transient fault. Transient faults, as discussed in the Background section, appear only for a brief period of time and typically disappear before the instruction is retried. The potential does exist, however, for the instruction to be retried more than once should the transient fault last for a relatively long time, i.e., longer than a few clock periods. The error recovery logic 34 monitors the number of attempts to execute the instruction. The error is recoverable if the number of attempts does not exceed a predetermined threshold. The error is deemed unrecoverable if the threshold is exceeded. The error recovery logic 34 makes an unrecoverable error signal available on line 66. In an embodiment of the present invention, the unrecoverable error signal is provided on one of the microcircuits' pin outs for use by other external recovery logic.

With reference to FIG. 2, a RISC processor 20 in accordance with an embodiment of the present invention is illustrated. The RISC processor 20 can be essentially any suitable processor for implementing the pipeline operation illustrated in FIG. 1. As shown, the RISC processor 20 includes an instruction fetch mechanism 22, a register fetch mechanism 24, an execution mechanism 26, a write-back mechanism 32, a comparator 28, and error recovery logic 34.

The instruction fetch mechanism 22 receives instructions from an instruction cache 36, which may be external or internal to the processor. The instruction cache 36 stores instructions for fast retrieval by the instruction fetch 22. Although the instruction fetch mechanism 22 preferably retrieves instructions from the instruction cache 36 since this retrieval process is quite quick, the instruction fetch can retrieve instructions from other memory devices which are not shown for purposes of brevity, though well known in the industry, if so desired. The instruction fetch mechanism 22 comprises a program counter 38, and a pipeline history cache 40. The program counter 38 is a register that contains the address of the next instruction to be fetched for execution. The program counter 38 is automatically incremented after each instruction is fetched so as to point to the next sequential instruction to be retrieved from the instruction cache 36. Thus, the instruction fetch address of the next instruction to be executed is sent from the program counter 38 to the instruction cache 36 such that the next instruction can be retrieved and sent to register fetch 24. The program counter 38 provides the instruction fetch address to the register fetch 24 and the pipeline history cache 40.

The pipeline history cache 40, in accordance with an embodiment of the present invention, stores a history of instructions being executed at each of the various stages in order to track an instruction in which an error occurs. The pipeline history cache 40 therefore receives the addresses of the instructions being executed from the program counter 38 and stores the addresses in sequential order.

Figure 3:
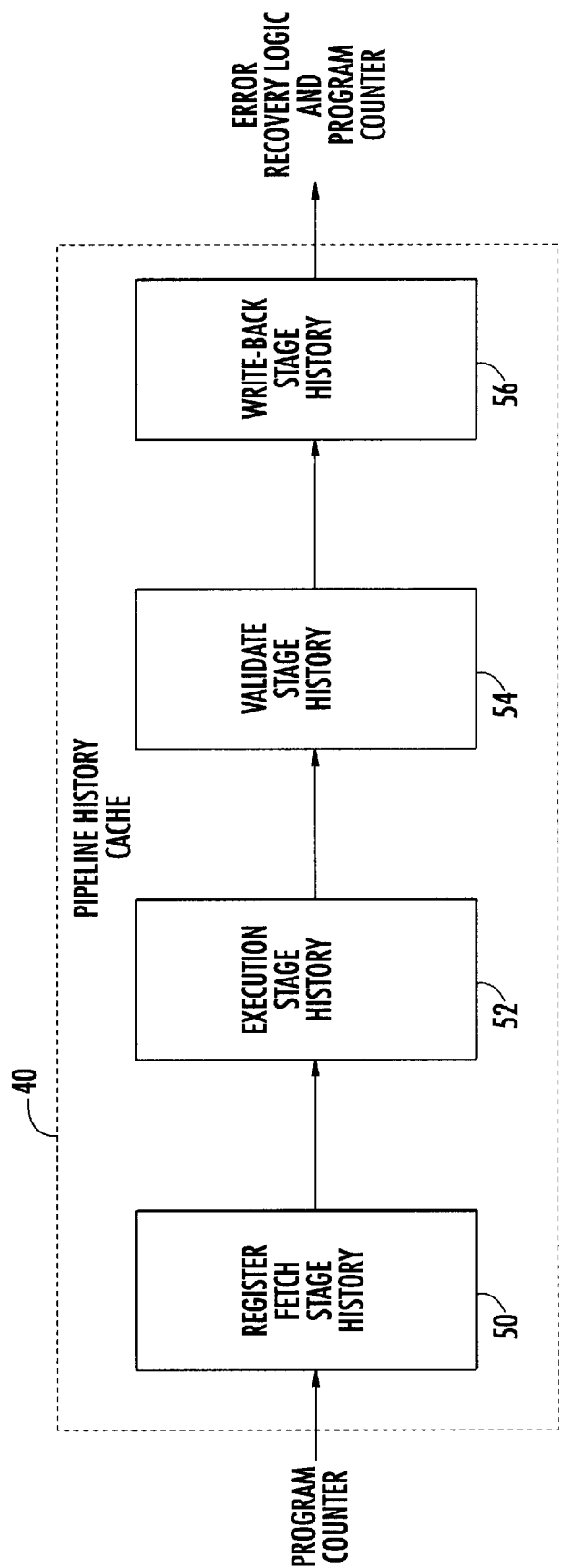
FIG. 3 is a schematic block diagram of the pipeline history cache of the processor of FIG. 2 in accordance with the present invention.

In a preferred embodiment as illustrated in FIG. 3, the pipeline history cache 40 is a first-in, first-out (FIFO) register that individually stores the instruction fetch address of the instruction currently being operated on by the register fetch 24 in the register fetch stage history 50, the instruction currently being operated on by the execution mechanism 26 in the execution stage history 52, the instruction currently being operated on by the comparator 28 in the validate stage history 54, and the instruction currently being operated on by the write-back mechanism 32 in the write-back stage history 56. Thus, with every clock cycle, as each instruction moves to the next stage, the instruction fetch address associated with each instruction likewise moves to the next register of the pipeline history cache 40. As described below, the output of the pipeline history cache 40 can be provided to both the program counter 38 for restarting the pipeline at the instruction in which an error occurred and the error recovery logic 34 for error reporting and other administrative needs.

Referring back to FIG. 2, the register fetch 24 receives the next instruction to be executed from the instruction fetch 22. The register fetch 24 decodes the instruction to determine which type of operation to perform on the operands, and which operands to retrieve from the register file 25 associated with the instruction in register fetch 24. In essence, the register file, as well known to one skilled in the art, is a memory device which provides persistent storage of the results of an executed instruction, including registers for storing the operands.

The operands retrieved by the register fetch 24 are then passed on to the execution mechanism 26 which typically comprises one or more of an arithmetic logic unit (ALU), a multiply/divide unit (MDU), and a shifter. Depending upon the particular instruction provided by the instruction fetch 22, the operands will be directed to the appropriate device (e.g., the ALU, MDU, or shifter) for execution.

In accordance with an embodiment of the present invention, the comparator 28 receives the results of the execution of the instruction by the execution mechanism 26. The comparator 28 validates or checks the results of the execution mechanism 26 prior to a permanent state change by the write-back mechanism 32. The validation of the execution of the instruction by the comparator 28 can be implemented by comparing the output of the arithmetic operators in a master/checker configuration within the processor. Alternatively, the checker may be another processor.

In a preferred embodiment of the present invention shown in FIGS. 3 and 4, a validate stage is provided following the execution stage in order to permit using an optimally short processor clock period. At lower clock frequencies, the validate stage may be performed as a part of the execution stage or the write-back stage. However, the time required for data from the master and checker circuits of the execution mechanism 26 to reach the comparator, to be compared, and then for an error flag to be set to prevent the write-back mechanism 32 from completing the write-back stage may be longer than a suitable clock period, given processor throughput requirements. By adding the validate stage, a full clock period is available for performing the comparison. Consequently, the need to reduce the clock frequency is not necessary.

In the next clock cycle the write-back mechanism 32 reads the error flag to control the action of the write-back stage. The additional validate stage may not delay subsequent instructions from using the results of the execution stage because the validate stage can be bypassed via line 60 which provides the results of the execution mechanism 26 stage directly to the register fetch 24 for use in subsequent instructions, even though the write-back mechanism 32 has not yet overwritten the respective registers of the register file 25. The write-back mechanism 32 receives the output from the execution mechanism on line 60 and waits for a signal from comparator 28 validating the output on line 62. A valid output causes the write-back mechanism to commit the output to the register file 25 via line 64.

In FIG. 4, a schematic illustration of a pipeline architecture including the validate stage is illustrated. Note that even with the additional stage, the pipeline architecture is still able to achieve the execution efficiency of one instruction per approximately every clock cycle due to concurrent execution.

Referring back to FIG. 2, if the comparator 28 detects an error in the execution of an instruction, an error flag is sent to the write-back mechanism 32 via line 62 so that the write-back mechanism 32 is prevented from updating the register file 25 (via the register fetch 24) with the results received from the execution mechanism 26, thereby preventing a permanent state change. In addition, upon detecting an error, the comparator 28 sends a retry signal to the error recovery logic 34. The error recovery logic 34 can perform numerous functions such as providing fault reports to outside agents for reporting and historically tracking the errors occurring within RISC processor 20. In addition, the error recovery logic 34 determines which address in the pipeline history cache 40 must be loaded in the program counter 38 for re-execution. Further, the error recovery logic 34 sends a retry signal to the program counter 38 directing the program counter 38 to abort all ongoing operations and restart the pipeline with the instruction stored at the instruction fetch address provided by the pipeline history cache 40. Because of the configuration of the pipeline history cache 40 as illustrated in FIG. 3, the output of the write-back stage history 56 is the instruction fetch address of the instruction last examined by the comparator 28 in the validate stage. That is, the pipeline history cache retains the instruction fetch address of the instruction to be processed by the corresponding pipeline stage. Therefore, by aborting all instructions in the pipeline that were subsequent to the instruction having the error, i.e., the instructions associated with the instruction fetch addresses in pipeline history cache registers 50, 52, and 54, the RISC processor 20 is able to restart at the instruction following the last successfully executed instruction. The instruction fetch address of that instruction is in pipeline history cache register 56.

Because no state has been permanently changed, the only information that is stored for the retry operation of the RISC processor 20 according to the present invention are the instruction fetch addresses stored in the pipeline history cache 40. In other words, no operands or additional data need be stored for retrying an instruction, and therefore, no additional hardware for memory is necessary. Furthermore, the overhead associated with check pointing is eliminated. The pipeline history cache 40 tracks the offending instruction at the execution stage so that following the detection of the error at the validate stage, the instruction fetch address of the erroneous instruction is at the output of the pipeline history 40 and is sent to the program counter 38. The program counter 38 then restarts the pipeline at that instruction fetch address upon receiving an appropriate signal from the error recovery logic 34.

It should be noted again that the validate stage may be performed as a part of the execution stage if the clock frequency of the RISC processor 20 is able to provide adequate time within a single clock period for the appropriate operations to be performed. Nonetheless, the addition of a stage may not adversely hinder the execution efficiency of the RISC processor 20.

Augmenting the instruction fetch and register fetch stages with error detection logic may be possible. In the disclosed embodiment of this invention, both stages are not augmented with error detection logic to keep the logic simple. The advantage of additional error detection logic is that the error can be detected as early as possible. However, the additional complexity does not always justify the benefits gained from a shorter error latency period since the typical length of a processor's clock period is on the order of nanoseconds.

II. Operation

Figure 5:
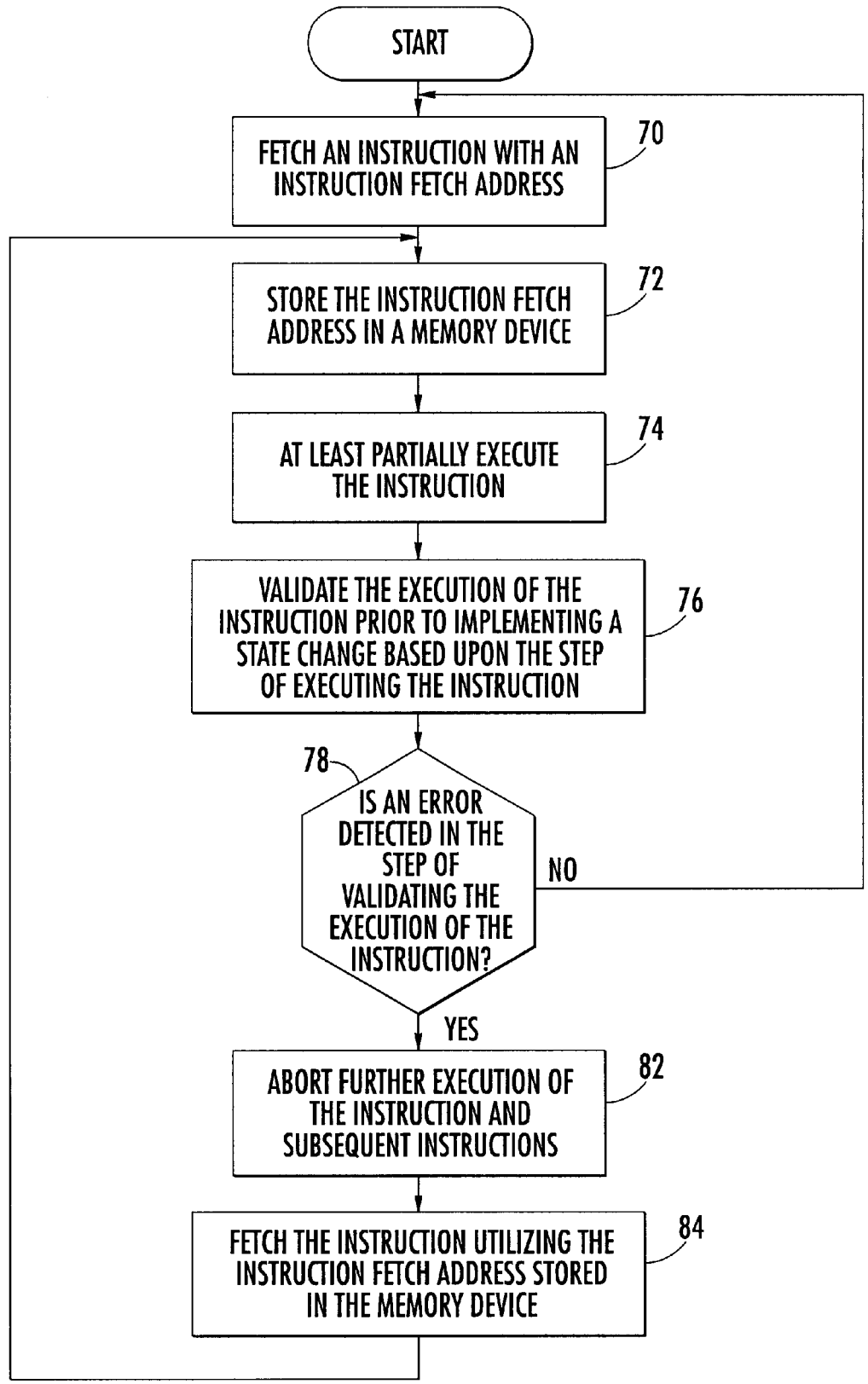
FIG. 5 is a flowchart of the operation of a reduced instruction set computer processor in accordance with an embodiment of the present invention.

The preferred operation and sequence of events corresponding with the RISC processor 20 of the present invention and the associated methodology are described hereafter with reference to FIG. 5.

In operation, an instruction having an instruction fetch address is initially fetched, as indicated by block 70. The instruction fetch address is stored in a memory device, such as a pipeline history cache, as indicated by block 72. Next, as indicated by block 74, the instruction is at least partially executed.

The execution of the instruction is then validated prior to implementing a state change based upon the execution of the instruction, as indicated in block 76. At block 78, if no error is detected in the step of validating the instruction, then the next instruction is fetched at block 70 and the process begins again at block 72. If there are no more instructions to be executed, then the process ends. If an error is detected at block 78, then the execution of subsequent instructions are aborted, as indicated by block 82. The instruction fetch address stored in the write-back stage history within the memory device is then used to fetch the instruction in which the error occurred, as indicated by block 84. This technique essentially causes the processor to perform a restart of the pipeline at the instruction that experienced the error, beginning again at block 72. Accordingly, the error recovery system and method of the present invention significantly reduces the amount of information and data that must be stored in comparison with conventional error recovery systems.

In the drawings specification, there had been disclosed typical preferred embodiments of the invention, and all of the specific terms are employed, they are used in a generic descriptive sense only and not for purposes of limitation, the scope of the invention being set forth in the following claims.

What is claimed is:

1. A method for error recovery in a RISC data processing system having a pipeline history cache and a pipeline including multiple stages, comprising the steps of:
    fetching an instruction having an instruction fetch address;
    storing the instruction fetch address in the pipeline history cache, wherein the pipeline history cache comprises a memory register file including a stage register for each pipeline stage;
    executing or at least partially executing the instruction;
    validating the execution or partial execution of the instruction;
    implementing a state change based upon validating the instruction;
    if an error is detected in said step of validating the execution of the instruction, then performing the following steps:
        fetching the instruction utilizing the instruction fetch address stored in the pipeline history cache, and
        re-executing or at least partially re-executing the instruction; and
    wherein said step of storing the instruction fetch address in the pipeline history cache includes storing the instruction fetch address in a first in, first out register file.

2. The method of claim 1, wherein said step of validating the execution of the instruction comprises comparing results from said step of executing the instruction with reference results.

3. The method of claim 1, further comprising the step of aborting the execution of the instruction if an error is detected in said step of validating the execution of the instruction.

4. The method of claim 1, wherein said step of aborting the execution of the instruction if an error is detected in said step includes aborting subsequent instructions that are yet to be validated.

5. The method of claim 1, further comprising the step of retrieving the instruction fetch address from the pipeline history cache if an error is detected in said step of validating the execution of the instruction.

6. The method of claim 1, wherein said step of validating the execution of the instruction includes the step of determining if a recoverable error occurred in the execution of the instruction.

7. A method for error recovery in a RISC data processing system having a pipeline history cache and a pipeline including multiple stages, comprising the steps of:
    fetching an instruction having an instruction fetch address;
    storing the instruction fetch address in the pipeline history cache, wherein the pipeline history cache comprises a memory register file including a stage register for each pipeline stage;
    executing or at least partially executing the instruction;
    validating the execution or partial execution of the instruction;
    implementing a state change based upon validating the instruction;
    if an error is detected in said step of validating the execution of the instruction, then performing the following steps:
        fetching the instruction utilizing the instruction fetch address stored in the pipeline history cache, and
        re-executing or at least partially re-executing the instruction; and
    wherein said step of storing the instruction fetch address comprises storing the instruction fetch address in a pipeline history cache comprising a register fetch stage history register, an execution stage history register downstream of the fetch stage history register, a validate stage history register downstream of the execution stage history register and a write-back stage history register downstream of the validate stage history register.

8. The method of claim 7, wherein said step of validating the execution of the instruction comprises comparing results from said step of executing the instruction with reference results.

9. The method of claim 7, further comprising the step of aborting the execution of the instruction if an error is detected in said step of validating the execution of the instruction.

10. The system of claim 7, wherein said step of aborting the execution of the instruction if an error is detected in said step includes aborting subsequent instructions that are yet to be validated.

11. The method of claim 7, further comprising the step of retrieving the instruction fetch address from the pipeline history cache if an error is detected in said step of validating the execution of the instruction.

12. The method of claim 7, wherein said step of validating the execution of the instruction includes the step of determining if a recoverable error occurred in the execution of the instruction.

* * * * *